March 15, 1938. F. C. SCHULTZ 2,110,944
COMBINATION TRUNK AND TRAILER
Filed May 18, 1936 2 Sheets-Sheet 1
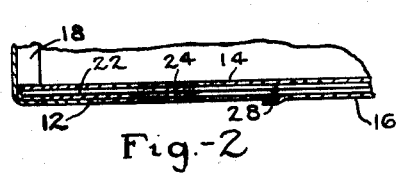
Fig.-2
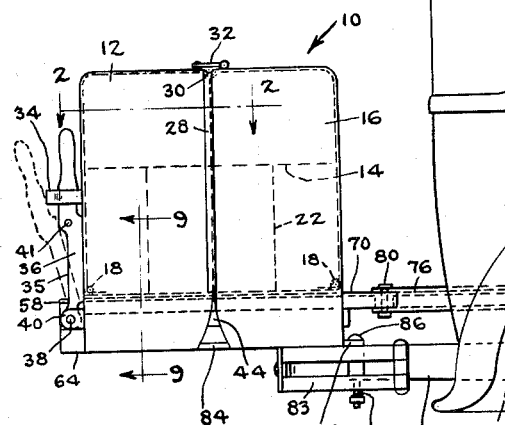
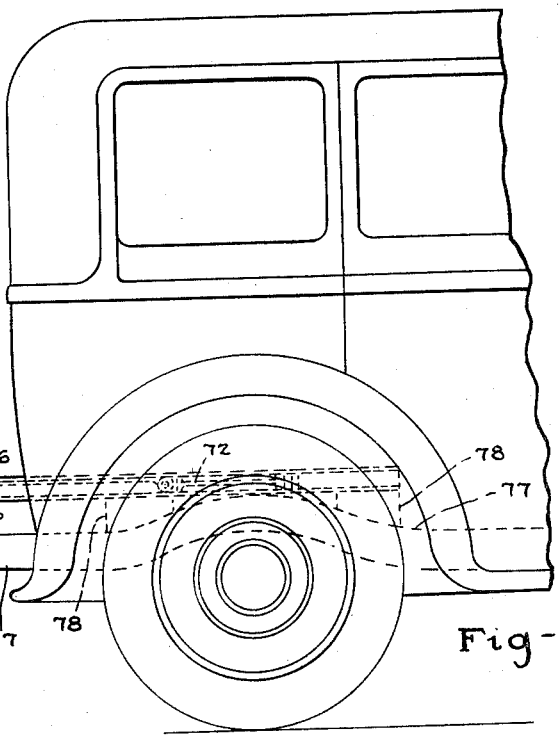
Fig.-1
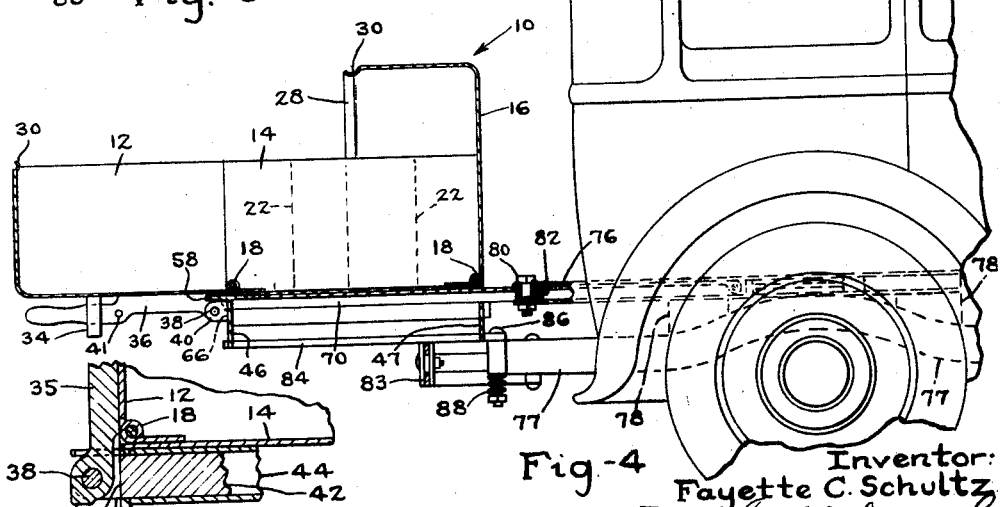
Fig.-3
Fig.-5
Fig.-4
Inventor:
Fayette C. Schultz
By
Attorney March 15, 1938. F. C. SCHULTZ 2,110,944
COMBINATION TRUNK AND TRAILER
Filed May 18, 1936 2 Sheets-Sheet 2
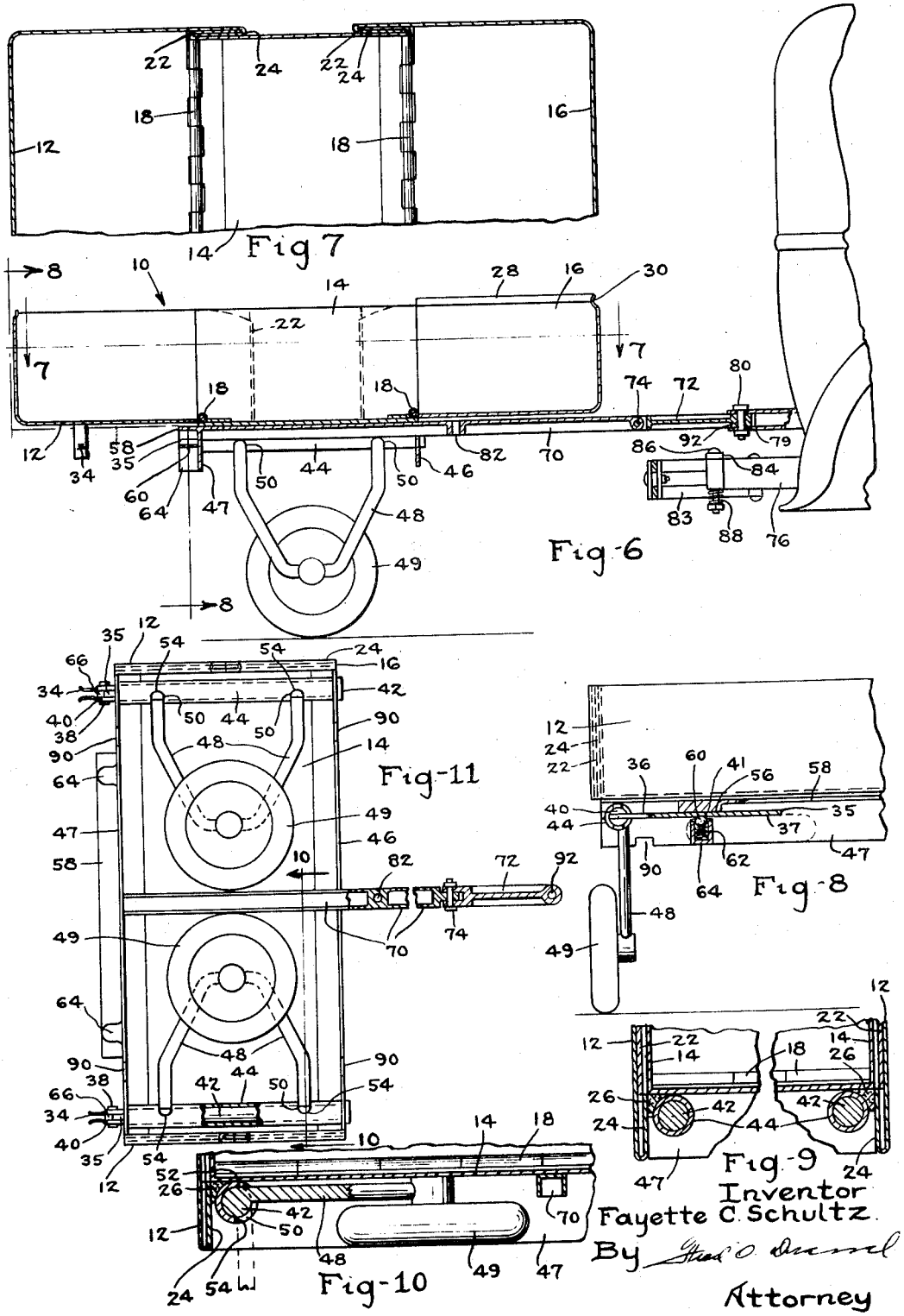
Inventor
Fayette C. Schultz
Attorney Patented Mar. 15, 1938

2,110,944

UNITED STATES PATENT OFFICE 2,110,944

COMBINATION TRUNK AND TRAILER

Fayette C. Schultz, Minneapolis, Minn.

Application May 18, 1936, Serial No. 80,278

7 Claims. (Cl. 280—33.4)

This invention relates to a device that is used either as a trunk or a trailer when used in combination with an automobile, said device supporting thereon a pair of tire wheels which will be concealed under the trunk when not in use, but of such construction so they can be let down to support the device when it is converted into a trailer, while at the same time said device supports a tongue having a universal joint thereon which is slidable in a draw bar or tubular member fastened to the automobile chassis, thus providing means for a short tongue when the device is used as a trunk and a long tongue having a universal joint connection with said draw bar when used as a trailer, making both trunk and trailer adaptable to be carried or conveyed by the automobile.

A further object is to provide a device for persons who very much desire some kind of a device which will make it possible for them to convert into a trailer for transporting articles that cannot go into a trunk while at the same time said device can be folded up into a trunk for the return trip after the articles have been delivered or vice versa.

A further object of the invention is to provide a device having its parts and frame work so constructed that the trunk may be easily and quickly opened for use as a trunk or it may be extended for use as a trailer without the use of tools, having only the bolt in the draw bar to tighten up.

Another object of the invention is to provide a device that is simple in construction, easy to manufacture and assemble but ornamental in design.

Other and further objects and features of the invention will more fully appear from the following description of the accompanying drawings and will be particularly pointed out in the claims.

The drawings illustrate in elevation and detail a preferred form of construction adapted for use in a combination trunk and trailer showing the broad principles of the invention.

In the drawings:

Fig. 1 is a side elevation of the device when used as a trunk on the rear of an automobile.

Fig. 2 is an enlarged detail sectional view on the line 2—2 of Fig. 1.

Fig. 3 is a top plan elevational view showing the draw bar or tubular member and the means for supporting the trunk turned in out of the way when the device is used as a trailer or when it is disconnected from the car.

Fig. 4 is a transverse central vertical sectional view of the trunk in open position, fastened to the rear of the automobile draw bar, the automobile being in side elevation.

Fig. 5 is an enlarged detail sectional view of the means for turning one of the shafts which support one of the wheels of the trailer.

Fig. 6 is a transverse vertical sectional view showing the device when used as a trailer and the means for fastening the trailer to the automobile draw bar.

Fig. 7 is fragmentary horizontal sectional view on the line 7—7 of Fig. 6 showing the hinges and means for locking the end members to the central member when used as a trailer.

Fig. 8 is a fragmentary sectional view on the line 8—8 of Fig. 6 showing one of the wheels down and locked in position when the device is used as a trailer.

Fig. 9 is an enlarged fragmentary sectional view on the line 9—9 of Fig. 1 showing the device in folded or trunk position.

Fig. 10 is an enlarged fragmentary sectional view on the line 10—10 of Fig. 11 showing one of the trailer wheels up under the trunk when not in use.

Fig. 11 is a bottom plan view showing the wheels up and the device folded in trunk position also showing the universal joint in section.

As illustrated herein the combination trunk and trailer 10 consists broadly of three separate units, 12, 14, and 16, which I will refer to as front, central, and rear, the front and rear units are shaped like a flat open scoop, or they may be referred to as L shape in cross section with the sides enclosed and are hinged to the central U shaped unit at 18, so that the front and rear units may be folded up as shown in Fig. 1 to form a closed sealed trunk, or the front unit 12, may be let down as shown in Fig. 2, to form an open carrier of larger capacity than that of the closed trunk. These hinged joints 18 also allow the trunk to be converted into a trailer, as shown in Fig. 3 the front and rear units 12, and 16, are dropped down and held in this fixed position by means of the interlocking flanges 22, and 24, which are on the outer extremities of the vertical side walls of the central unit 14, and the inner extremities of the side walls of the units 12 and 14, as shown in Figs. 6 and 7. These flanges disengage each other when the device is used to form a trunk as shown in Figs. 1, 9, 10, and 11, but to keep the dust from entering the trunk at the bottom a felt dust strip 26, is provided as shown fastened to the bottom of the unit 14, and extending the full width of said trunk. To prevent dust and water from entering the sides and top of the trunk shown in Figs. 1 and 2, the unit 16, has been provided with strips 28, and 30, which overlap that part of the unit 12, where the units edges abut each other when folded together. To assist in holding the units together when folded into a trunk and to prevent anyone from entering said trunk a pair of locks 32, are provided on the upper or end surfaces of the units 12, and 16. The unit 12, carries a pair of spring clips 34, which support a handle 35, which is pivoted at 38, in an eye 40, of a shaft 42. There is a pair of these shafts 42, which are journaled in pipes 44, said pipes being welded to cross angle members 46 and 47, which are integral with the bottom of the central unit 14, as shown in Figs. 2, 5, 6, 9, 10, and 11. These shafts 42, have integral therewith extensions 48, which support the axles for the wheels 49. These extensions 48, extend from the shafts 42, thru apertures 50, in the pipes 44, as shown. When the wheels are up as shown in Fig. 10 each extension 48, engages its respective aperture 50 at 54, thus said apertures prevent the extensions 48, and the wheels 49 from further outward movement and assist in keeping the wheels in correct alignment with the road, but this correct alignment is further assisted by a pair of arms 35. Each arm 35, having sides 36 and 37 are placed as shown in Fig. 8, when the wheels are down to prevent the wheels from turning in. The sides 36, of the arms 35, as shown engage surfaces 56, of a front extension 58, on the front angle 47, and the other sides 37, of the arms 35, have apertures 41, therein, which engage balls 60, thus holding the arms in a fixed and rigid position by means of the tension applied to the balls by the springs 62, held in sockets 64, as shown. These arms and extensions just described and being part of the shafts 42, thus prevent the wheels from turning in or out when the wheels are down, thereby making the wheels firm and rigid when the device is set up to be conveyed as a trailer. These arms 35, also move the wheels from the raised to lowered position or vice versa, but in doing so they must be first released from either the spring clips 34, or the sockets 64, and placed, in approximate position as shown in dotted lines Fig. 1, thus allowing them to be turned 90 degrees either way and then locked in place. The arms 35, also help support the unit 12, when they are down as shown in Fig. 4, there being a flat portion 66, on the arms as shown in Fig. 5, which engage the shaft 44, at 68, thus preventing the arms from further downward movement and which will assist the unit 12, Fig. 4 from dropping down. This completes the description of the units 12, 14, and 16, and the parts which make up the trunk and trailer, but the means for supporting them to a car will now be described.

In Fig. 11 is shown the width of the trunk and trailer, and centrally thereon is a U shaped member or tongue 70, welded to the angles 46, 47, and the unit 14. This tongue 70, projects beyond the units 14, and 16, and has a universal joint connecting link 72, pivotally mounted thereto at 74. This tongue is supported in a draw bar or tubular member 76, which is fastened to the car chassis 77, at 78. This draw bar 76, projects out a short distance from the rear of the car and has a perpendicular hole 79, therein for receiving a bolt 80. When the device is made into a trunk the tongue 70, is pushed into the tube 76, until a hole 82, located in the tongue 70, engaged the hole 79. This allows the placing of the bolt 80, thru the holes 79, and 82, so that the tongue can be clamped rigid to the tubular member or draw bar 76. This bolt could not hold the trunk rigid without the use of the bumper 83, and some additional support, therefore a pair of arms 84, are moved out from the position shown in Fig. 3, to the position shown in Figs. 1 and 4, to support the trunk at the bottom. These arms 84, are pivoted from the chassis 76, at 86, being held in closed position by tension from the springs 88, and open position by the spring 88, and the slots 90, in the angle 46, and 47, when they are supporting the trunk. In Fig. 6, the tongue 70, is pulled out of the tube so that the device can be used as a trailer. The universal joint connection has a hole 92, therein which registers with the hole 79, thereby allowing the bolt 88, to tie the arm 72, to the draw bar or tubular member 76. This connection allows the trailer to be free from interference with the bumper and also allows the trailer to have a universal joint connection with the draw bar or tubular member 76.

The combination trunk and trailer being very easy to use and the operations required for converting the trunk into a trailer or vice versa is very simple and positive. The bolt 88, is removed, and the tongue 70, is pulled out by means of taking hold of the trunk at the front and walking backward. It is only necessary to pull the device back far enough until the trailer wheels 49, will clear the bumpers, then the handles 35, are pulled out of the spring clips 34, thus allowing the wheels 49, to be dropped to the ground and locked in a vertical position by means of locking the handles 35, so the apertures 41, engage the balls 60. The trailer is then pulled out until the hole 92, in the link 72, engages the hole 79 in the draw bar 76 thus allowing the bolt 80 to pivotally clamp the tongue to the draw bar 76. The front unit 12, and rear unit 16, are then let down and the arms 84, are pushed in as shown in Fig. 3, thus completing the assembling for the trailer, it being understood that the making of a trunk would require these same operations but vice versa.

This concludes the description of my device both in detail and operation.

What I claim is:

1. The combination with the rear end of a towing vehicle, a trunk support carried by said vehicle rear end, of a combined trunk and trailer, said combined trunk and trailer comprising a frame for supporting a receptacle, said frame having a drawbar connection to the towing vehicle, said connection having means whereby it can be shortened or lengthened for positioning the frame on the vehicle carried support or to the rear of the vehicle carried support, and supporting wheel means carried by the frame and adapted to engage the ground and support the frame when used as a trailer and to the rear of the vehicle carried support.

2. A device as set forth in claim 1 wherein the drawbar connection comprises telescopic engaged members, one of said members being carried by the vehicle and the other by the frame, a hinged connection between said sections, said hinged connection forming a trailer connection when the parts are extended and a fixed frame holding means when the frame is on the vehicle support.

3. A device as set forth in claim 1 wherein the supporting wheels carried by the frame are foldable into the under side of said frame, and means for holding said wheels in folded position and in extended position.

4. A device as set forth in claim 1 including rock shafts carried by the frame and extending across a chamber therein, fixed sleeves in which said shafts are rockably mounted, said rock shafts having wheel carrying brackets, wheels carried by said brackets and means cooperating with the rock shafts whereby the wheels and brackets may be extended and held in ground engagement or folded into the chamber of the frame and held therein.

5. The combination with the rear end of a vehicle having a luggage support thereon, of a combined trailer and luggage carrier, said trailer and luggage carrier having a frame adapted to be received on the luggage support of the vehicle or positioned rearwardly thereof when used as a trailer, extensible wheels carried by said frame and adapted to engage the ground when used as a trailer and an extensible drawbar connection between the vehicle and frame and forming means whereby the frame may be positioned rearwardly of the luggage support or supported on the luggage support, and held thereon.

6. A device as set forth in claim 5 wherein the drawbar connection comprises telescopically engaged sections.

7. A device as set forth in claim 5 wherein the ground engaging wheels are foldable into a chamber within the underside of the frame and means for holding said wheels within the chamber.

FAYETTE C. SCHULTZ.